（12）United States Patent
Ruiz-Garcia et al.

(10) Patent No.: US 10,855,093 B2
(45) Date of Patent: Dec. 1, 2020

(54) APPARATUS AND METHOD FOR MONITORING BATTERIES AND STORING DATA BASED ON BATTERY STATUS (71) Applicant: Lear Corporation, Southfield, MI (US)

(72) Inventors: Daniel Ruiz-Garcia, Valls (ES); Victor Navarro-Cases, Valls (ES); Josep Benet-Freissinier, Valls (ES); Sergio Alquezar-Alquezar, Valls (ES)

(73) Assignee: LEAR CORPORATION, Southfield, MI (US)

( * ) Notice: Subject to any disclaimer, the term of this patent is extended or adjusted under 35 U.S.C. 154(b) by 190 days.

(21) Appl. No.: 16/045,409

(22) Filed: Jul. 25, 2018

(65) Prior Publication Data
US 2020/0036203 A1 Jan. 30, 2020

(51) Int. Cl.
H02J 7/00 (2006.01)
B60L 58/12 (2019.01)

(52) U.S. Cl.
CPC ........... *H02J 7/0047* (2013.01); *B60L 58/12* (2019.02); *H02J 7/0063* (2013.01); *H02J 2007/0067* (2013.01)

(58) Field of Classification Search
CPC .................. H02J 7/0047; H02J 7/0063; H02J 2007/0067; B60L 58/12
USPC .................. 320/104, 136, 157; 713/310, 340
See application file for complete search history.

(56) References Cited

U.S. PATENT DOCUMENTS

| 8,970,265 | B2 | 3/2015 | McIntosh et al. | |
|---|---|---|---|---|
| 2009/0187781 | A1* | 7/2009 | Gronemeier | G06F 1/305 713/340 |
| 2013/0002030 | A1* | 1/2013 | Kumagai | H02J 7/0014 307/77 |
| 2014/0281597 | A1 | 9/2014 | Stone et al. | |
| 2015/0224946 | A1 | 8/2015 | Sato et al. | |
| 2016/0111907 | A1 | 4/2016 | Lynds | |

* cited by examiner

*Primary Examiner* — Edward Tso
*Assistant Examiner* — Aaron Piggush
(74) *Attorney, Agent, or Firm* — Brooks Kushman P.C.

(57) ABSTRACT

In at least one embodiment, an apparatus for monitoring a power feed from a plurality of batteries in a vehicle is provided. The apparatus includes a controller. The controller includes a first circuit portion and a microprocessor. The first circuit portion is configured to receive a first signal indicative of a first power feed for a first battery and a second signal indicative of a second power feed for a second battery. The first circuit portion is further configured to transmit an interrupt signal indicative of each of the first power feed and the second power feed being equal to or below a minimum voltage threshold. The microprocessor includes an interrupt input and is configured to enter into an emergency operation mode to store data corresponding to at least one vehicle operation for a predetermined amount of time in response to receiving the interrupt signal at the interrupt input.

14 Claims, 3 Drawing Sheets

APPARATUS AND METHOD FOR MONITORING BATTERIES AND STORING DATA BASED ON BATTERY STATUS

TECHNICAL FIELD

Aspects disclosed herein generally relate to an apparatus and method for monitoring batteries and for storing data based on battery status. These aspects and others will be discussed in more detail herein.

BACKGROUND

U.S. Publication No. 2009/0187781 to Gronemeier et al. discloses vehicular electronic control units and their operating methods which cost effectively compensate momentary external power loss by reducing the unit's power consumption while external power is lost. In an exemplary embodiment, external power loss is detected by the electronic control unit's microprocessor. The microprocessor thereupon disables some components within the electronic control unit and operates with limited functionality for the duration of external power loss. The electronic control unit uses internal energy storage, e.g., a hold capacitor, to sustain its limited functionality operation. Upon recovery from the external power loss the electronic control unit resumes full operation.

SUMMARY

In at least one embodiment, an apparatus for monitoring a power feed from a plurality of batteries in a vehicle is provided. The apparatus includes a controller. The controller includes a first circuit portion and a microprocessor. The first circuit portion is configured to receive a first signal indicative of a first power feed for a first battery and a second signal indicative of a second power feed for a second battery. The first circuit portion is further configured to transmit an interrupt signal indicative of each of the first power feed and the second power feed being equal to or below a minimum voltage threshold. The microprocessor includes an interrupt input and is configured to enter into an emergency operation mode to store data corresponding to vehicle operations for a predetermined amount of time in response to receiving the interrupt signal at the interrupt input.

In another embodiment, a method for monitoring a power feed from a plurality of batteries in a vehicle is provided. The method includes receiving, at a first circuit portion, a first signal indicative of a first power feed for a first battery and a second signal indicative of a second power feed for a second battery and transmitting an interrupt signal indicative of each of the first power feed and the second power feed being equal to or below a minimum voltage threshold to a microprocessor. The method further includes entering into an emergency operation mode to store data corresponding to vehicle operations for a predetermined amount of time in response to receiving the interrupt signal at an interrupt input of a microprocessor.

In another embodiment, an apparatus for monitoring a power feed from a plurality of batteries in a vehicle is provided. The apparatus includes a controller. The controller includes a first circuit portion and a microprocessor. The first circuit portion is configured to receive a first signal indicative of a first power feed for a first battery and a second signal indicative of a second power feed for a second battery. The first circuit portion is further configured to transmit an interrupt signal indicative of each of the first power feed and the second power feed being equal to or below a minimum voltage threshold. The microprocessor includes an interrupt input and is configured to store data corresponding to vehicle operations for a predetermined amount of time prior to the microprocessor being disabled in response to receiving the interrupt signal at the interrupt input.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a computer-program that is embodied in a non-transitory computer readable medium programmed to perform any number of the functions as disclosed.

Figure 1:
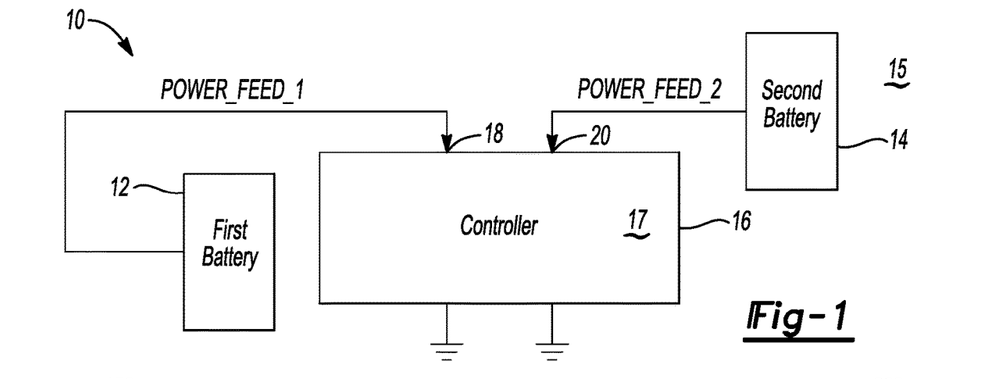
FIG. 1 depicts an apparatus for monitoring batteries and for storing data based on a monitored battery status in accordance to one embodiment.

FIG. 1 generally illustrates an apparatus 10 for monitoring a power feed from a first battery 12 and a second battery 14 in a vehicle 15. The power feed may correspond to a voltage of approximately 12 volts. The system 10 includes a controller 16 that receives a first power feed (e.g., signal POWER_FEED_1) from the first battery 12 and a second power feed (e.g., signal POWER_FEED_2) from the second battery 14. The controller 16 includes a first input 18 for receiving the first power feed from the first battery 12. The controller 16 includes a second input 20 for receiving the second power feed from the second battery 14. The controller 16 generally includes any number of microprocessors, integrated circuits, and memory to control various vehicle operations. The controller 16 may be operably coupled to any number of additional vehicle controllers (not shown) via one or more data communication buses (not shown). The controller 16 may store and process data received on the data communication buses to perform any number of vehicle operations. The controller 16 may also transmit processed data thereon to the various vehicle controllers via the data communication bus.

In general, the controller 16 is configured to monitor the first power feed from the first battery 12 and the second power feed from the second battery 14 to determine whether the first battery 12 and/or the second battery 14 exhibit a voltage dropout condition. For example, the controller 16 is configured to determine whether the first and the second power feed from the first battery 12 and the second battery 14, respectively, falls below a minimum voltage threshold for a predetermined length of time (e.g., 0 to 30 ms). The controller 16 is configured to write the processed data on a memory device 17 prior to a voltage dropout condition. When the controller 16 determines that the first power feed and the second power feed from both the first battery 12 and the second battery 14, respectively, fall below the minimum voltage threshold (e.g., 3+/−0.5 volts), this condition generally indicates that the first power feed from the first battery 12 and the second power feed from the second battery 14 will fall to nearly zero volts. In general, the controller 16 is configured to operate when the voltage from the first battery 12 and the second battery 14 is greater than, for example, 3.5 volts. Generally, as the first battery 12 and the second battery 14 are independent of one another, the length of time at which the first power feed and the second power feed fall below the minimum voltage threshold is also independent. The controller 16 enters into an emergency storage mode and stores the processed data once the first power feed from the first battery 12 and the second power feed from the second battery 14 falls below the minimum voltage threshold for a predetermined amount of time (e.g., 30 ms). For example, the controller 16 stores the processed data for a time period of 30 ms after the first power feed from the first battery 12 and the second power feed from the second battery 14 falls below the minimum voltage threshold. The controller 16 readies itself for a supply loss and enters into a loop to look for a power supply recovery (or to look for a voltage recovery). If the first power feed from the first battery 12 and if the second power feed from the second battery 14 remain below the minimum voltage threshold that exceeds the predetermined amount of time (e.g., 30 ms), then the controller 16 exhausts any remaining energy (or power) and is then disabled until the first power feed or the second power feed exceed the minimum voltage threshold. Once the first power feed from the first battery 12 and/or the second power feed from the second battery 14 is recovered, then the controller 16 enters into a normal mode and resumes normal operation.

Figure 2:
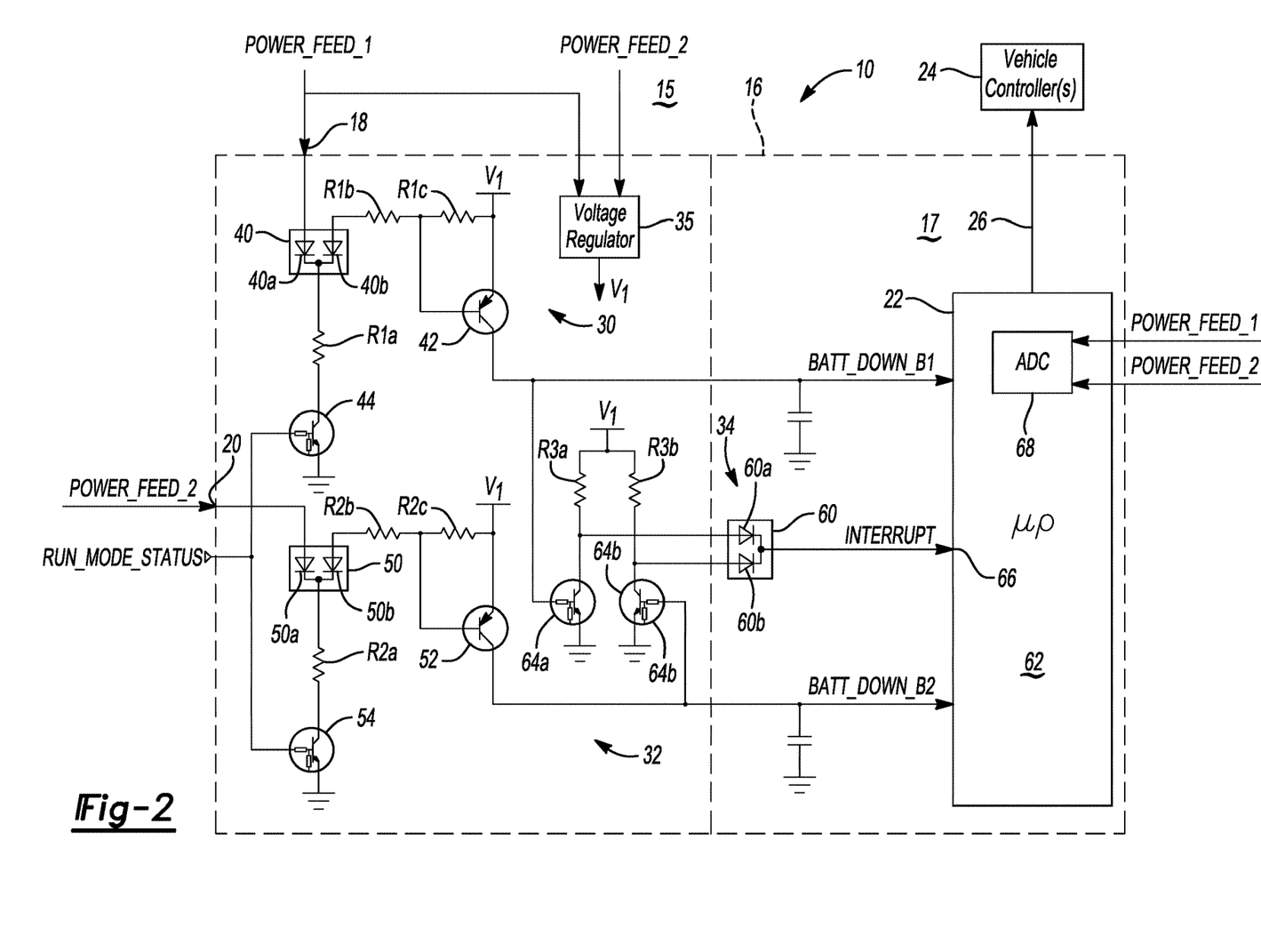
FIG. 2 depicts a more detailed view of the apparatus for monitoring batteries and for storing data based on battery status in accordance to one embodiment.

FIG. 2 depicts a more detailed view of the apparatus 10 for monitoring the first battery 12 and the second battery 14, and for storing data based on battery status in accordance to one embodiment. The controller 16 includes one or more microprocessors 22 (hereafter "microprocessor 22") for processing any of the vehicle functions that are required to be performed by the controller 16. As noted above, the controller 16 may be arranged to perform various vehicle operations. Such vehicle operations may include but not limited to, remote keyless operations, battery charging operations, lighting operations, etc. While performing any of the foregoing operations, the controller 16 is generally configured to transmit data to the vehicle controllers 24 in the vehicle 15 via one or more data communication buses 26 (hereafter "data communication bus 26"). In addition, the controller 16 is configured to receive data from the vehicle controllers 24 via the data communication bus 26.

The controller 16 includes a first circuit portion 30, a second circuit portion 32, a third circuit portion 34, and a voltage regulator 35. The first circuit portion 30 generally includes various electronics for enabling the microprocessor 22 to ascertain the voltage level of the first power feed (or signal POWER_FEED_1) as provided from the first battery 12. The first circuit portion 30 is generally configured to provide an output signal (e.g., BATT_DOWN_1) that is indicative of the voltage level of the first battery 12. The first circuit portion 30 may be implemented as an analog to digital converter (in addition to a comparator) that provides a high or low digital output on the output signal BATT_DOWN_1. The first circuit portion 30 includes a first plurality of resistors R1a, R1b, R1c, a first diode circuit 40, a first transistor 42, and a second transistor 44. The first circuit portion 30 provides the signal BATT_DOWN_1 to the microprocessor 22. The signal BATT_DOWN_1 is a voltage that is indicative of the voltage on the signal POWER_FEED_1. The voltage regulator 35 provides a voltage (e.g., V1) to the resistors R2b and R2c and to the first transistor 42.

The second circuit portion 32 generally includes various electronics for enabling the microprocessor 22 to ascertain the voltage level of the second power feed (or signal POWER_FEED_2) as provided from the second battery 14. The second circuit portion 32 may be implemented as an analog to digital converter (in addition to a comparator) that provides a high or low digital output on the output signal BATT_DOWN_2. For example, the second circuit portion 32 includes a second plurality of resistors R2a, R2b, R2c, a second diode circuit 50, a first transistor 52, and a second transistor 54. The second circuit portion 32 is generally configured to provide an output signal (e.g., BATT_DOWN_2) that is indicative of the voltage level of the second battery 14. The voltage regulator 35 provides the voltage (V1) to the resistors R2b and R2c and to the first transistor 52.

The third circuit portion 34 is generally configured to provide a signal INTERRUPT that corresponds to the battery level status for both the first battery 12 and the second battery 14. The third circuit portion 34 includes a third plurality of resistors R3a, R3b, a third diode circuit 60, and a plurality of transistors 64a, 64b. The first power supply (e.g., V1) is arranged to provide a voltage to the resistors R3a and R3b, the third diode circuit 60, and the plurality of transistors 64a, 64b. In the event the battery level status for the first battery 12 and/or the secondary battery 14 is above the minimum voltage threshold, then the third circuit portion 34 transmits the signal INTERRUPT at a high level (e.g., 5 volt or other suitable value) to the microprocessor 22.

The microprocessor 22 in this case refrains from entering into the emergency storage mode since both the first battery 12 and the second battery 14 do not exhibit a low voltage condition. In the event the battery level status for both the first battery 12 and the secondary battery 14 is below the minimum voltage threshold, then the third circuit portion 34 transmits the signal INTERRUPT at a low level (e.g., around zero volts other suitable value) to the microprocessor 22 to control the microprocessor 22 to enter into the emergency storage mode to store data prior to the battery level for each of the first battery 12 and the second battery 14 reaching zero volts. This condition ensures that the microprocessor 22 is able to access the data when the battery level for the first battery 12 and/or the second battery 14 rises above the minimum voltage threshold at a later point in time.

Assuming that the voltage on the signal POWER_FEED_1 and on the signal POWER_FEED_2 is at an acceptable or otherwise normal value (e.g., the voltage from both batteries 12, 14 are above the minimum voltage threshold) (e.g., the apparatus 10 operations in a first mode when the voltage on the signals POWER_FEED_1 and POWER_FEED_2 is at an acceptable value), the first circuit portion 30, the second circuit portion 32, and the third circuit portion 34 operate in the following manner. For example, in the first circuit portion 30, the first diode block 40 receives the signal POWER_FEED_1 from the first battery 12. The first diode block 40 includes a first diode 40a and a second diode 40b. Therefore, the first diode 40a receives the signal POWER_FEED_1 from the first battery 12. In the event the voltage on the signal POWER_FEED_1 is above a diode cutoff voltage of, for example, 0.6V, the first diode 40a enables the voltage on the signal POWER_FEED_1 to pass to the second transistor 44. The second diode 40b serves as a blocking diode thereby preventing the voltage regulator 35 from providing a voltage to the resistors R1b, R1c. Thus, the first circuit portion 30 provides an open circuit to the transistor 64a. In turn, the third diode circuit 60 of the third circuit portion 64 provides a high level on the signal INTERRUPT to the microprocessor 22 which indicates that the voltage level on the signal POWER_FEED_1 is at an acceptable level.

Likewise, for the second circuit portion 32, the second diode block 50 receives the signal POWER_FEED_2 from the second battery 14. The second diode block 50 includes a first diode 50a and a second diode 50b. Therefore, the first diode 50a receives the signal POWER_FEED_2 from the second battery 12. In the event the voltage on the signal POWER_FEED_2 is above a diode cutoff voltage of, for example, 0.6V, the first diode 50a enables the voltage on the signal POWER_FEED_2 to pass to the fourth transistor 44. The second diode 50b serves as a blocking diode thereby preventing the voltage regulator 35 from providing the voltage to the resistors R2b, R2c and the third transistor 42 provides a low voltage output. Thus, the second circuit portion 32 provides an open circuit to the transistor 64b. In turn, the third diode circuit 60 of the third circuit portion 64 provides a high level on the signal INTERRUPT to the microprocessor 22 which indicates that the voltage level on the signal POWER_FEED_2 is at an acceptable level.

In the event the voltage on the signal POWER_FEED_1 is below the minimum voltage threshold and the voltage on the signal POWER_FEED_2 is above the minimum voltage threshold (or is otherwise acceptable) (e.g., the apparatus 10 operates in a second mode when the voltage on the signal POWER_FEED_1 is below the minimum voltage threshold and the voltage on the signal POWER_FEED_2 is acceptable), then the operation of the first circuit portion 30 changes while the operation of the second circuit portion 32 remains the same as described directly above in connection with the first mode. For example, in the first circuit portion 30, the voltage on the signal POWER_FEED_1 does not exceed the cutoff voltage of the first diode 40a. In this case, the first diode 40a now serves as a blocking diode whereas the voltage regulator 35 provides the voltage to the resistors R1b, R1c and the voltage across the second diode 40b exceeds the cutoff voltage of the second diode 40b. The first transistor 42 is then activated to provide a current output which activates the transistor 64a to provide a current across R3a which lowers the voltage input to the first diode 60a. The signal BATT_DOWN_B1 corresponds to a digital output from the first transistor 42 that may indicate that the signal POWER_FEED_1 is low. In one example, when the signal POWER_FEED is below 3.5V, the first transistor 42 is activated. The second circuit portion 32 provides an open circuit to the transistor 64a. The third diode circuit 60 of the third circuit portion 34 provides a high level on the signal INTERRUPT to the microprocessor 22. As noted above, since at least one of the signals POWER_FEED_1 and POWER_FEED_2 (in this case the signal POWER_FEED_2) is above the minimum voltage threshold, the apparatus 10 refrains from entering into an emergency storage operation.

In the event the voltage on the signal POWER_FEED_2 is below the minimum voltage threshold for a period of time that exceeds the predetermined length of time and the voltage on the signal POWER_FEED_1 is above the minimum voltage threshold (or is otherwise acceptable) (e.g., the apparatus 10 operates in a third mode when the voltage on the signal POWER_FEED_2 is below the minimum voltage threshold and the voltage on the signal POWER_FEED_1 is acceptable), then operation of the second circuit portion 32 changes while the operation of the first circuit portion 30 remains the same as described directly above in connection with the first mode. For example, in the second circuit portion 32, the voltage on the signal POWER_FEED_2 does not exceed the cutoff voltage of the first diode 50a. In this case, the first diode 50a now serves as a blocking diode whereas the voltage regulator 35 provides voltage to the resistors R2b, R2c and the voltage across the second diode 50b exceeds the cutoff voltage of the second diode 50b. The third transistor 52 is then activated to produce a current output which activates the transistor 64b to provide a current across R3b which lowers the voltage input to the second diode 60b. The signal BATT_DOWN_B2 corresponds to a digital output from the third transistor 52 which indicates that the signal POWER_FEED_2 is low. The third diode circuit 60 provides a high level on the signal INTERRUPT to the microprocessor 22. As noted above, since at least one of the signals POWER_FEED_1 and POWER_FEED_2 (in this case POWER_FEED_1) is above the minimum voltage threshold, the apparatus 10 refrains from entering into an emergency storage operation.

In the event the voltage on the signals POWER_FEED_1 and POWER_FEED_2 is each below the minimum voltage threshold (e.g., the apparatus 10 operates in a fourth mode), then the controller 16 enters into the emergency storage operation. For example, the first circuit portion 30 operates in the manner noted above in connection with the second mode as noted above and the second circuit portion 32 operates in the manner noted above in connection with the third mode as noted above. In this case, each transistor 64a and 64b of the third circuit portion 34 output a low output to the third diode circuit 60. The third diode circuit 60 provides a low level on the signal INTERRUPT to the microprocessor 22. The signal BATT_DOWN_B1 corresponds to the output from the first transistor 42 which indicates that the signal POWER_FEED_1 is low. The signal BATT_DOWN_2 corresponds to the output from the second transistor 52 which indicates that the signal POWER_FEED_2 is low.

In general, the microprocessor 22 enters into the emergency storage mode in the fourth mode and stores the processed data once the first power feed from the first battery 12 and the second power feed from the second battery 14 falls below the minimum voltage threshold. As noted above, the minimum voltage threshold generally corresponds to the first battery 12 and the second battery 14 each providing a voltage output of, for example, less than 3.0+/−0.5 volts. Generally, the microprocessor 22 (or controller 16) remains in the emergency storage mode to store the processed data for a predetermined amount of time. In one example, the microprocessor 22 remains in the emergency storage mode for 30 ms. For example, the microprocessor 22 may include a capacitor 62 for storing a voltage to ensure that the microprocessor 22 stays alive for the predetermined amount of time to store the processed data while in the emergency storage operation. It is recognized that the capacitor 62 may either be internal or external to the microprocessor 22. The overall size or value (e.g., capacitance) of capacitor 62 may be selected to ensure that the capacitor 62 provides the stored voltage to the microprocessor 22 for the predetermined amount of time.

The controller 16 readies itself for a supply loss and enters into a loop to look for a power supply recovery (or to look for a voltage recovery) upon expiration of the predetermined amount of time (e.g., when the controller 16 exits from the emergency storage mode). If the first power feed from the first battery 12 and if the second power feed from the second battery 14 remain below the minimum voltage threshold for a time-period that exceeds the predetermined amount of time, then the controller 16 disables the storing operation and exhausts any remaining energy (or power) and is then disabled until the voltage from the first battery 12 or the second battery 14 exceed the minimum voltage threshold. Once the first power feed from the first battery 12 and/or the second power feed from the second battery 14 is recovered, then the controller 16 enters into a normal mode and resumes normal operation.

It is recognized that the controller 16 will not have advance notice of when the first battery 12 and the second battery 14 will fail or provides a voltage that is below the minimum voltage threshold. The controller 16 is required to store the processed data within the 30 ms timeframe (e.g., the predetermined amount of time) based on Original Equipment Manufacturer (OEM) requirements. However, the issue is providing adequate notice to the microprocessor 22 to store the processed data upon detecting the that the voltage of the first battery 12 and the second battery 14 has reached the minimum voltage threshold so that the microprocessor 22 stores the processed data within the predetermined amount of time upon entering into the emergency storage mode.

Given that the predetermined amount of time may correspond to a relatively small window of time and that the microprocessor 22 executes software to reads the inputs on the signals BATT_DOWN_B1 and BATT_DOWN_B2 in a period of time that exceeds the OEM timing requirement to store the processed data upon the first and second batteries 12, 14 reaching the minimum voltage threshold, the controller 16 utilizes the third circuit portion 34 to provide the signal INTERRUPT to an interrupt pin 66 which aids in enabling the microprocessor 22 to quickly determine that the first and second batteries 14, 16 has failed or provides a voltage that reaches the minimum voltage threshold prior to the expiration of the 30 ms requirement. For example, the first and the second circuit portions 30, 32 provide the signals BATT_DOWN_B1 and BATT_DOWN_B2 as digital inputs to the microprocessor 22. The microprocessor 22 executes software to read various inputs (including the inputs that receive the signals BATT_DOWN_B1 and BATT_DOWN_B2 every 10 ms). The microprocessor 22 further executes software to employ a "debounce" process to acknowledge a proper receipt of digital input only after, for example, four consecutive readings with the same value. Thus, the microprocessor 22 may correctly acknowledge the data on the signals BATT_DOWN_B1 and BATT_DOWN_B2 correspond to the minimum voltage threshold after 40 ms (e.g., four consecutive readings of digital input on signals BATT_DOWN_B1 and BATT_DOWN_B2). In this case, the controller 16 may not detect that the voltage from the first and second battery 14, 16 is equal to, or less than the minimum voltage threshold within the 30 ms timing requirement. To resolve this condition, the third circuit portion 34 is configured to provide the signal INTERRUPT to the interrupt pin 66 of the microprocessor 22. This aspect enables the controller 16 to detect that the voltage from the first and second battery 12, 14 is equal to, or less than the minimum voltage threshold within the 30 ms OEM timing requirement and further enables the controller 16 to enter into the emergency storage mode to store the processed data before the internal capacitor 62 completely discharges its voltage. In this case, the microprocessor 22 may monitor for the signal INTERRUPT to transition from a rising signal edge to a falling signal edge on the interrupt pin 66 to serve as a trigger to enter into the emergency storage mode.

Figure 3:
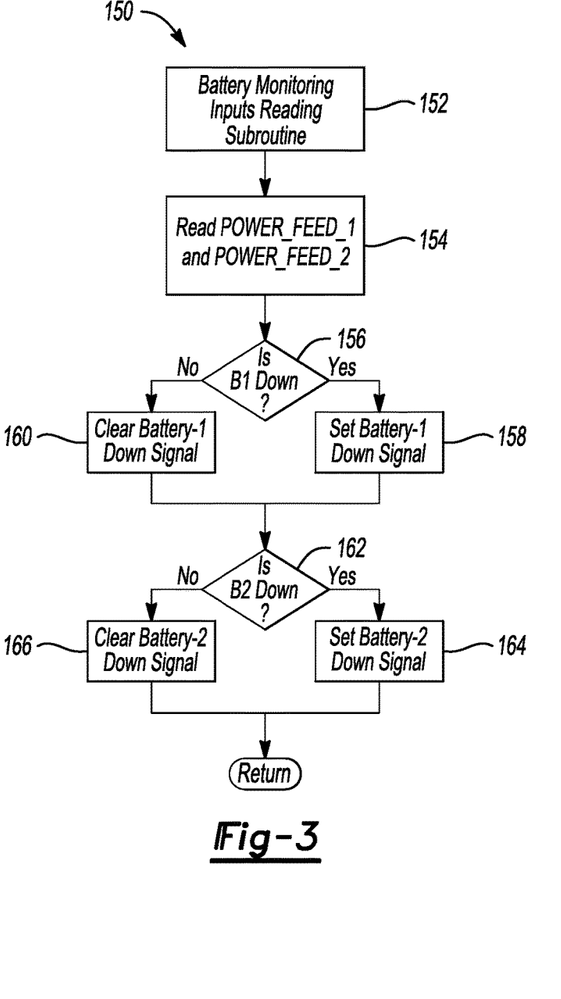
FIG. 3 depicts a method for monitoring batteries and for storing data based on a monitored battery status in accordance to one embodiment.

The microprocessor 22 includes an analog to digital converter (ADC) 68 that receives an analog version of the voltages from the first battery 12 and the second battery 14. The ADC 68 converts the analog version of the voltages from the first battery 12 and the second battery 14 into digital values. The digital values provide an indication as to whether the voltages from the first battery 12 or the second battery 14 are above or below the minimum threshold value. The microprocessor 22 monitors the digital values on the signals BATT_DOWN_B1 and BATT_DOWN_2 to determine if those particular digital values provide a same state as the digital values provided from the ADC 68. In this case, the microprocessor 22 determines whether the state of the first battery 12 and the second battery 14 (e.g., whether the voltage from the first battery 12 or the second battery 14 is over or under the minimum voltage threshold) as provided to the ADC 68 match the state of the first battery 12 and the second battery 14 as indicated by the signals BATT_DOWN_B1 and BATT_DOWN_B2. In the event there is a mismatch between the states of the voltage of the first battery 12 as provided to the ADC 68 and the voltage on the signal BATT_DOWN_B1 or a mismatch between the states of the voltage of the second battery 14 as provided to the ADC 68 and the voltage on the signal BATT_DOWN_B2, then the controller 16 generates an alert to notify a user that there is an issue with the controller 16. FIG. 3 as set forth below explains this aspect.

FIG. 3 illustrates a method 150 of monitoring the power feed from the first battery 12 and the second battery 14 at the microprocessor 22.

In operation 152, the controller 16 (or the microprocessor 22) executes a battery monitoring input reading subroutine.

In operation 154, the controller 16 measures an analog version of the voltage from the first battery 12 and also reads the digital data on the signal BATT_DOWN_B1. Likewise, the controller 16 measures an analog version of the voltage from the second battery 14 and also reads the digital data on the signal BATT_DOWN_B2.

In operation 156, the controller 16 determines whether the analog version of the voltage from the first battery 12 corresponds to a value that is similar to a value of the digital data on the signal BATT_DOWN_B1. For example, the controller 16 determines whether the analog version of the voltage from the first battery 12 provides a value that corresponds digital data that is being read on the signal BATT_DOWN_B1. If this condition is true, then the method 150 moves to operation 158. If not, then the method 150 moves to operation 160.

In operation 158, the controller 16 determines that there is a mismatch between the analog version of the voltage from the first battery 12 and the digital data on the signal BATT_DOWN_B1 and sets a diagnostic trouble code (DTC) which alerts the user that there is an issue with the digital data being read on the signal BATT_DOWN_B1. The DTC is generally indicative of the first circuit portion 30 exhibiting a malfunction.

In operation 160, the controller 16 determines that there is no issue and clears the data that was previously read on the signal BATT_DOWN_B1.

In operation 162, the controller 16 determines whether the analog version of the voltage from the second battery 14 corresponds to a value that is similar to a value of the digital data on the signal BATT_DOWN_B2. For example, the controller 16 determines whether the analog version of the voltage from the second battery 14 provides a value that corresponds digital data that is being read on the signal BATT_DOWN_B2. If this condition is true, then the method 150 moves to operation 164. If not, then the method 150 moves to operation 166.

In operation 164, the controller 16 determines that there is a mismatch between the analog version of the voltage from the second battery 14 and the digital data on the signal BATT_DOWN_B2 and sets a DTC which alerts the user that there is an issue with the digital data being read on the signal BATT_DOWN_B2. The DTC is generally indicative of the second circuit portion 32 exhibiting a malfunction.

In operation 166, the controller 16 determines that there is no issue and clears the data that was previously read on the signal BATT_DOWN_B2. The method 150 is then re-executed.

Figure 4:
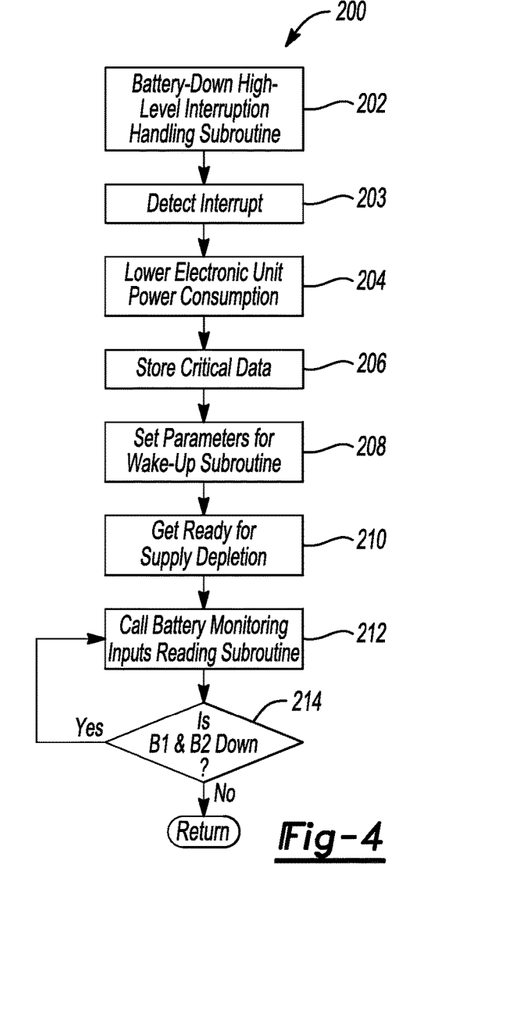
FIG. 4 depicts a method for storing data when a first battery and a second battery exhibit a low voltage condition in accordance to one embodiment.

FIG. 4 illustrates a method 200 for storing data when the first battery 12 and the second battery 14 exhibit a low voltage condition.

In operation 202, the controller 16 (or the microprocessor 22) executes a battery-down high-level interruption subroutine.

In operation 203, the microprocessor 22 detects an interrupt on the interrupt pin 66 (e.g., the signal INTERRUPT transitions from high to low in response to the third circuit portion 34 detecting that the first battery 12 and the second battery 14 each provide a voltage that is equal or less than the minimum voltage threshold).

In operation 204, the controller 16 lowers power consumption while receiving voltage from the capacitor 62.

In operation 206, the controller 16 stores local data that is being utilized by one or more microprocessors 22 to perform various desired operation(s) while receiving voltage from the capacitor 62. The data may correspond to vehicle speed, transmission status, seatbelt status, oil temperature, exterior lighting, wipers, electrical drive by wires, etc. The types of data that are stored during a voltage dropout condition is generally dictated by an Original Equipment Manufacturer (OEM). The controller 16 stores the data during the voltage dropout condition to ensure that that data can be accessed once the voltage dropout condition is removed and the voltage from the first battery 12 or the second battery 14 has increased to a normal voltage range.

In operation 208, the controller 16 sets parameters for a wake-up subroutine prior to the capacitor 62 being discharged. The wake-up procedure is generally as follows. When the vehicle is parked, all vehicle controllers go to "sleep" or enter into a low power consumption mode. While in the low power consumption mode (or upon expiration of the emergency operation mode), Random Accessible Memory (RAM) may lose all of its data. Thus, after a wake-up operation (i.e., voltage from the first battery 12 and the second battery 14 is above minimum voltage threshold and the controller 16 no longer operates in the emergency operation mode), the controller 16 performs basic verifications, reads specific configuration data and loads the RAM properly based on the data that was stored during the emergency operation mode.

In operation 210, the controller 16 readies itself for supply depletion prior to the capacitor 62 being discharged. In this case, the controller 16 readies itself for disconnect from the first battery 12 and the second battery 14 for a total loss of battery power.

In operation 212, the controller 16 (or microprocessor 22) re-executes the battery monitoring inputs reading subroutine as set forth in operation 152 of FIG. 3. In this case, the method 150 is re-executed again to determine whether the first battery 12 and the second battery 14 each exhibit a low voltage condition. For example, if the low voltage condition is asserted at the interrupt pin 66, the microprocessor 22 will move to a low power condition and save data. At this point, the microprocessor 22 checks to determine if the first battery 12 or the second battery 14 have come back and the controller 16 will turns off if the power remains below the minimum voltage threshold as noted above. In the event of a voltage transient on the power feed from the first battery 12 and the second battery 14, the controller 16 detect the low voltage condition for a short time (e.g., a few ms) before the first battery 12 or the second battery 14 provide an acceptable voltage output normal within the time the microprocessor 22 is still operative. As soon as the low voltage condition is not detected by the method 150, the controller 16 can come back to normal operation.

In operation 214, the controller 16 determines whether the first battery 12 and the second battery 14 each exhibit a low voltage condition. If this condition is true, the method 200 moves back to operation 212.

In general, the controller 16 determines whether the voltage from the power feed from the first battery 12 or the second battery 14 has increased (or has been recovered) before a total supply loss. If the vehicle network has recovered for either of the first battery 12 or the second battery 14, then operation 152 is executed again.

It is recognized that the controller 16, while in a sleep mode, may periodically wake-up, and monitor the various outputs from the first circuit portion 30, the second circuit portion 32, and the third circuit portion 34 to monitor whether the digital inputs for the signals BATT_DOWN_B1 and BATT_DOWN_B2 match the measured analog values. In the case where the signal INTERRUPT has been set to indicate that the first battery 12 and the second battery 14 provide a voltage that is equal or below the minimum voltage threshold, the controller 16 will not periodically wake-up given that there is no power to the controller 16. Once the voltage from the first battery 12 and/or the second battery 14 exceed the minimum voltage threshold, the controller 16 wakes up. Generally, the sleep mode may correspond to when ignition status is OFF, etc. It is also recognized that the controller 16 may be configured to receive an indication of the vehicle being involved in a crash or accident via one or more of the vehicle controllers 24. In this case, the controller 16 may monitor the voltage for the first battery 12 and/or the second battery 14 and transmit a signal indicative of the first battery 12 and/or the second battery 14 being down during a crash scenario to another vehicle that is capable of wirelessly transmitting a notification to an E-call center. This aspect may be performed while the microprocessor 22 receives voltage from the capacitor 62 within the discharge time window (e.g., 30 ms).

Figure 5:
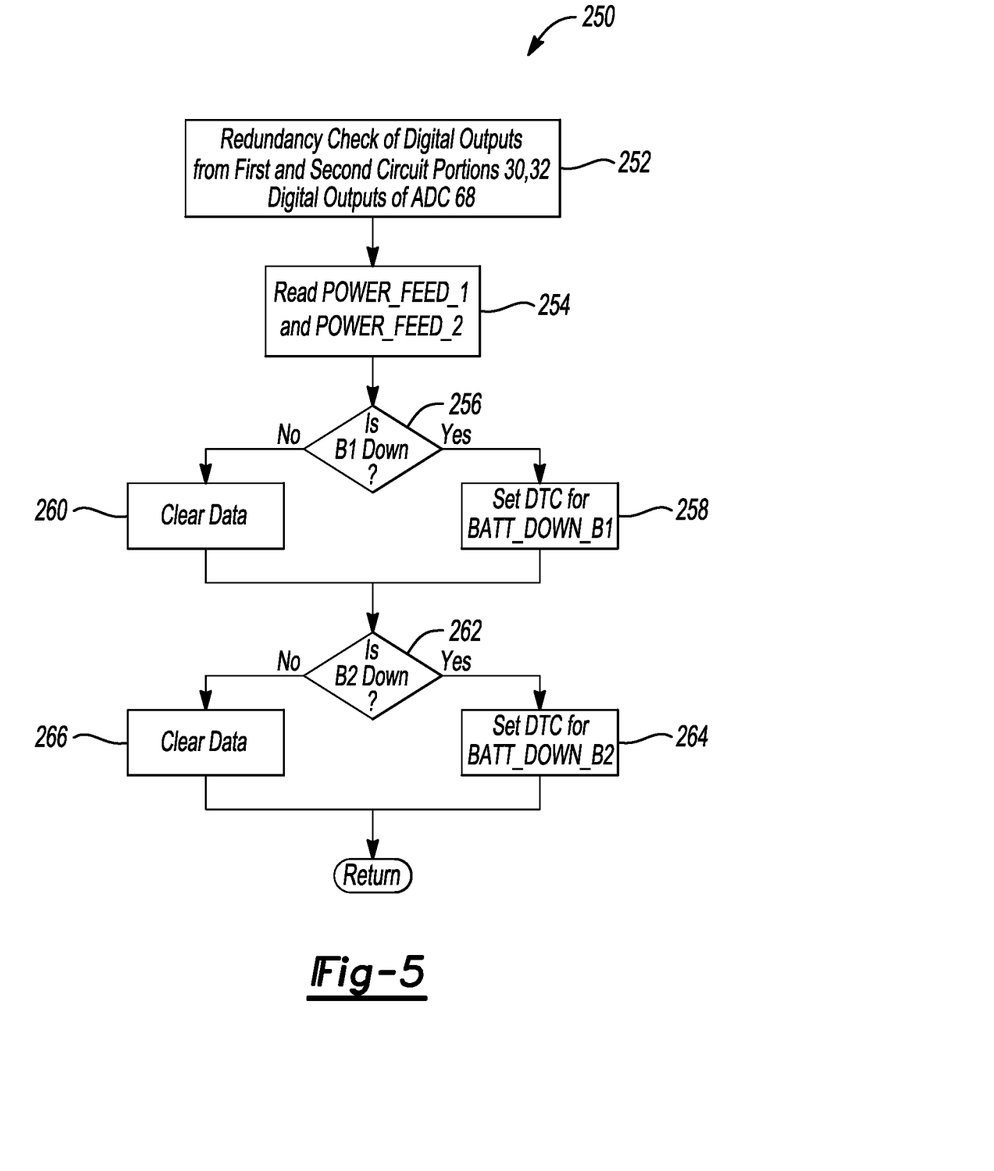
FIG. 5 illustrates a method for monitoring digital outputs from a first circuit portion, a second circuit portion, and an analog to digital converter in accordance to one embodiment.

FIG. 5 illustrates a method 250 for monitoring digital outputs from the first circuit portion 30, the second circuit portion 32, and the ADC 68.

In operation 252, the controller 16 (or the microprocessor 22) executes a battery monitoring input reading subroutine.

In operation 254, the controller 16 converts an analog value of the voltage from the first battery 12 into a digital version via the ADC 68 and also reads the digital data on the signal BATT_DOWN_B1. Likewise, the controller 16 converts an analog value of the voltage from the second battery 14 and also reads the digital data on the signal BATT_DOWN_B1.

In operation 256, the controller 16 determines whether the state of the first battery 12 (e.g., whether the voltage from the first battery 12 is over or under the minimum voltage threshold) as provided to, and converted by the ADC 68 matches the state of the first battery 12 as indicated by the signal BATT_DOWN_B1. If there is a mismatch between the state of the first battery 12 as converted by the ADC 68 and the state of the first battery 12 as indicated by the signal BATT_DOWN_B1, then the method 250 moves to operation 258. If not, then the method 250 moves to operation 260.

In operation 258, the controller 16 determines that there is a mismatch between the analog version of the voltage from the first battery 12 and the digital data on the signal BATT_DOWN_B1 and sets a diagnostic trouble code (DTC) which alerts the user or a service center that there is an issue with the digital data being read on the signal BATT_DOWN_B1 or the data on the output of the ADC 68 with respect to the analog to digital conversion of the first power feed from the first battery 12. The DTC is generally indicative of the first circuit portion 30 or the ADC 68 exhibiting a malfunction.

In operation 260, the controller 16 determines that there is no issue and clears the data that was previously read on the signal BATT_DOWN_B1.

In operation 262, the controller 16 determines whether the state of the second battery 14 (e.g., whether the voltage from the second battery 14 is over or under the minimum voltage threshold) as provided to, and converted by the ADC 68 matches the state of the second battery 14 as indicated by the signal BATT_DOWN_B2. If there is a mismatch between the state of the second battery 14 as converted by the ADC 68 and the state of the second battery 14 as indicated by the signal BATT_DOWN_B2, then the method 250 moves to operation 264. If not, then the method 250 moves to operation 266.

In operation 264, the controller 16 determines that there is a mismatch between the analog version of the voltage from the second battery 14 and the digital data on the signal BATT_DOWN_B2 and sets the DTC which alerts the user or a service center that there is an issue with the digital data being read on the signal BATT_DOWN_B2 or the data on the output of the ADC 68 with respect to the analog to digital conversion of the second power feed from the second battery 14. The DTC is generally indicative of the second circuit portion 32 or the ADC 68 exhibiting a malfunction.

In operation 266, the controller 16 determines that there is no issue and clears the data that was previously read on the signal BATT_DOWN_B2. The method 250 is then re-executed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for monitoring a power feed from a plurality of batteries in a vehicle, the apparatus comprising:
   a controller including:
      a first circuit portion configured to:
         receive a first signal indicative of a first power feed for a first battery and a second signal indicative of a second power feed for a second battery; and
         transmit an interrupt signal indicative of each of the first power feed and the second power feed being equal to or below a minimum voltage threshold; and
      a second circuit portion configured to transmit a first digital voltage output indicative of the first power feed for the first battery being one of greater than the minimum voltage threshold and less than the minimum voltage threshold to the microprocessor; and
   a microprocessor including an interrupt input and being configured to enter into an emergency operation mode to store data corresponding to at least one vehicle operation for a predetermined amount of time in response to receiving the interrupt signal at the interrupt input,
   wherein the microprocessor includes an analog to digital converter (ADC) to receive a first analog voltage output indicative of the first power feed for the first battery being one of greater than the minimum voltage threshold and less than the minimum voltage threshold and to convert the first analog voltage output into a second digital voltage output, and
   wherein the microprocessor is configured to transmit an alert indicating that the controller is malfunctioning in the event the first digital voltage output indicates that the first power feed for the first battery is different than the first power feed for the first battery as indicated by the second digital voltage output.

2. The apparatus of claim 1, wherein the predetermined amount of time corresponds to an amount of time a capacitor provides power to the microprocessor with a voltage thereof.

3. The apparatus of claim 1, wherein the microprocessor is not capable of storing data corresponding to the at least one vehicle operation upon expiration of the predetermined amount of time.

4. The apparatus of claim 1, wherein the second circuit portion is configured to:
receive the first power feed for the first battery as a first analog input;
convert the first analog input of the first power feed into a first digital output that corresponds to a first voltage of the first power feed, and
transmit the first digital output to the first circuit portion.

5. The apparatus of claim 4, wherein the controller further includes a third circuit portion configured to:
receive the second power feed for the second battery as a second analog input;
convert the second analog input of the second power feed into a second digital output that corresponds to a second voltage of the second power feed, and
transmit the second digital output to the second circuit portion.

6. The apparatus of claim 5, wherein the first circuit portion is further configured to transmit the interrupt signal based on the first digital output and the second digital output.

7. The apparatus of claim 1, further comprising a third circuit portion configured to transmit a third digital voltage output indicative of the second power feed for the second battery being one of greater than the minimum voltage threshold and less than the minimum voltage threshold to the microprocessor.

8. The apparatus of claim 7, wherein the ADC is configured to receive a second analog voltage output indicative of the second power feed for the second battery being one of greater than the minimum voltage threshold and less than the minimum voltage threshold and to convert the second analog voltage output into a fourth digital voltage output.

9. The apparatus of claim 8, wherein the microprocessor is configured to transmit an alert indicating that the controller is malfunctioning in the event the third digital voltage output indicates that the second power feed for the second battery is different than the second power feed for the second battery as indicated by the fourth digital voltage output.

10. A method for monitoring a power feed from a plurality of batteries in a vehicle, the method comprising:
receiving, at a first circuit portion, a first signal indicative of a first power feed for a first battery and a second signal indicative of a second power feed for a second battery;
transmitting an interrupt signal indicative of each of the first power feed and the second power feed being equal to or below a minimum voltage threshold to a microprocessor;
entering into an emergency operation mode to store data corresponding to at least one vehicle operation for a predetermined amount of time in response to receiving the interrupt signal at an interrupt input of a microprocessor;
processing, at the microprocessor, a first digital version of the first signal that is indicative of the first power feed to generate a first digital signal;
receiving, at the microprocessor, another signal indicative of the first power feed for the first battery;
processing, at the microprocessor, a second digital version of the another signal that is indicative of the first power feed to generate a second digital signal;
comparing the first digital signal to the second digital signal; and
transmitting an alert indicating that a controller is malfunctioning in the event the first digital signal indicates that the first power feed for the first battery is different than the first power feed for the first battery as indicated by the second digital signal.

11. The method of claim 10, wherein the predetermined amount of time corresponds to an amount of time a capacitor provides power to the microprocessor with a voltage thereof.

12. The method of claim 11 further comprising preventing a storage of data corresponding to the at least one vehicle operation upon an expiration of a predetermined amount of time.

13. An apparatus for monitoring a power feed from a plurality of batteries in a vehicle, the apparatus comprising:
a controller including:
a first circuit portion configured to:
receive a first signal indicative of a first power feed for a first battery and a second signal indicative of a second power feed for a second battery; and
transmit an interrupt signal indicative of each of the first power feed and the second power feed being equal to or below a minimum voltage threshold; and
a microprocessor including an interrupt input and being configured to store data corresponding to at least one vehicle operation for a predetermined amount of time prior to the microprocessor being disabled in response to receiving the interrupt signal at the interrupt input, wherein the microprocessor is further configured to:
process a first digital version of the first signal that is indicative of the first power feed to generate a first digital signal;
receive another signal indicative of the first power feed for the first battery;
process a second digital version of the another signal that is indicative of the first power feed to generate a second digital signal;
compare the first digital signal to the second digital signal; and
transmit an alert indicative of a malfunction in the event the first digital signal indicates that the first power feed for the first battery is different than the first power feed for the first battery as indicated by the second digital signal.

14. The apparatus of claim 13, wherein the controller is further configured to transmit a second signal indicative of a low power condition for the first battery and the second battery during the predetermined amount of time.

* * * * *